US008135267B2

(12) United States Patent
Sakamoto et al.

(10) Patent No.: US 8,135,267 B2
(45) Date of Patent: Mar. 13, 2012

(54) AUTOFOCUS IMAGING OPTICAL SYSTEM AND IMAGE PICKUP DEVICE

(75) Inventors: Masaru Sakamoto, Utsunomiya (JP); Ryuji Nurishi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 573 days.

(21) Appl. No.: 11/530,554

(22) Filed: Sep. 11, 2006

(65) Prior Publication Data

US 2007/0076541 A1    Apr. 5, 2007

(30) Foreign Application Priority Data

Sep. 13, 2005    (JP) .................................. 2005-266057

(51) Int. Cl.
| | |
|---|---|
| G03B 17/00 | (2006.01) |
| G03B 13/00 | (2006.01) |
| G02B 7/04 | (2006.01) |
| G02B 27/10 | (2006.01) |
| H04N 5/262 | (2006.01) |

(52) U.S. Cl. .... 396/80; 250/201.2; 348/350; 348/240.3; 348/345; 359/618

(58) Field of Classification Search ........................ None
See application file for complete search history.

(56) References Cited

U.S. PATENT DOCUMENTS

| | | | | |
|---|---|---|---|---|
| 4,517,666 | A * | 5/1985 | Ando | 369/44.24 |
| 4,547,663 | A | 10/1985 | Kitagishi et al. | |
| 5,410,532 | A * | 4/1995 | Ono et al. | 369/112.16 |
| 6,344,639 | B1 | 2/2002 | Shirai | |
| 6,418,108 | B1 * | 7/2002 | Ueda et al. | 369/112.23 |
| 6,734,903 | B1 * | 5/2004 | Takeda et al. | 348/219.1 |
| 2001/0050892 | A1 * | 12/2001 | Takahashi et al. | 369/112.1 |
| 2003/0223340 | A1 * | 12/2003 | Miyake et al. | 369/53.26 |
| 2005/0018561 | A1 * | 1/2005 | Miyake | 369/44.41 |
| 2005/0041949 | A1 | 2/2005 | Onuki et al. | |

FOREIGN PATENT DOCUMENTS

| | | |
|---|---|---|
| JP | 63124219 A | 5/1988 |
| JP | 63124219 U | 8/1988 |
| JP | 01-133015 | 5/1989 |
| JP | 3-037608 A | 2/1991 |
| JP | 3037608 A | 2/1991 |
| JP | 4134316 A | 5/1992 |
| JP | 2003-279842 | 10/2003 |

(Continued)

OTHER PUBLICATIONS

A. G. Dewey, Improving the Efficiency and Image-Uniformity of a Simple Reflective Light Valve Projector, IBM Technical Disclosure Bulletin, Apr. 1980, pp. 5062-5063, vol. 22, No. 11, IBM Corporation, Armonk, New York.

(Continued)

*Primary Examiner* — Wayne Young
*Assistant Examiner* — Carl Adams
(74) *Attorney, Agent, or Firm* — Rossi, Kimms & McDowell LLP

(57) ABSTRACT

An image pickup device in which reflectance in a central portion of the splitting optical system is configured large and that in a peripheral portion is configured small, to thereby selectively reflect only a light beam for focus detection in focus detection means and transmit the other portions of the light beam to the image pickup means so that a decrease in an amount of light for the image pickup means can be reduced while securing an amount of light for focus detection.

11 Claims, 10 Drawing Sheets

FOREIGN PATENT DOCUMENTS

| | | |
|---|---|---|
| JP | 2003-279846 | 10/2003 |
| JP | 2003-279847 | 10/2003 |
| JP | 2003-287673 | 10/2003 |
| JP | 3112472 B2 | 11/2011 |

OTHER PUBLICATIONS

Extended European Search Report dated Jan. 10, 2007 for European patent application No. 06120475.6.

* cited by examiner

AUTOFOCUS IMAGING OPTICAL SYSTEM AND IMAGE PICKUP DEVICE

BACKGROUND OF THE INVENTION

1. Field of the Invention

The present invention relates to an autofocus imaging optical system which includes a splitting optical system in an optical path, splits a light beam in an image pickup optical system for focus state detection and detects a focus state of an image pickup lens, and to an optical apparatus, image pickup device and the like including the autofocus imaging optical system.

2. Description of the Related Art

For auto-focusing (AF) technologies in a photographic device such as a still camera or video camera, various approaches have been proposed hitherto. Especially, for example in Japanese Patent Application Laid-Open Nos. 2003-279842, 2003-279846, 2003-279847 and 2003-287673, a lens-image pickup device which includes a splitting optical system in a optical path and AF detection means provided in a split optical path is disclosed.

However, if a light beam used for image pickup is split for focus detection as described above, transmittance in an image pickup device may decrease and T number may increase. Therefore, an image becomes darker or an exposure time increases due to the insufficient light amount. Then, a more amount of light for focus detection may be required to improve focus accuracy or to enable to range the subject in a low illuminance condition. Accordingly, the image may further become darker.

SUMMARY OF THE INVENTION

It is an object of the present invention, overcoming problems above mentioned, to reduce a decrease in light amount for image pickup due to the focus detection while securing an amount of light for a focus detection system. Further, it is an object to realize an autofocus imaging optical system, optical apparatus and image pickup device which may provide a pictorial image having a sufficient amount of light, while keeping a higher AF accuracy even in a low illuminance condition.

In order to achieve objects above described, according to the present invention, at least one splitting optical system having an ununiform reflectance is provided in an optical path on the image side of a focus lens unit, which allows a focus state to be detected using a light beam split by the splitting optical system.

Further features of the present invention will become apparent from the following description of exemplary embodiments with reference to the attached drawings.

DESCRIPTION OF THE EMBODIMENTS

The present invention will be described in detail with respect to illustrated embodiments.

First Embodiment

Figure 1:
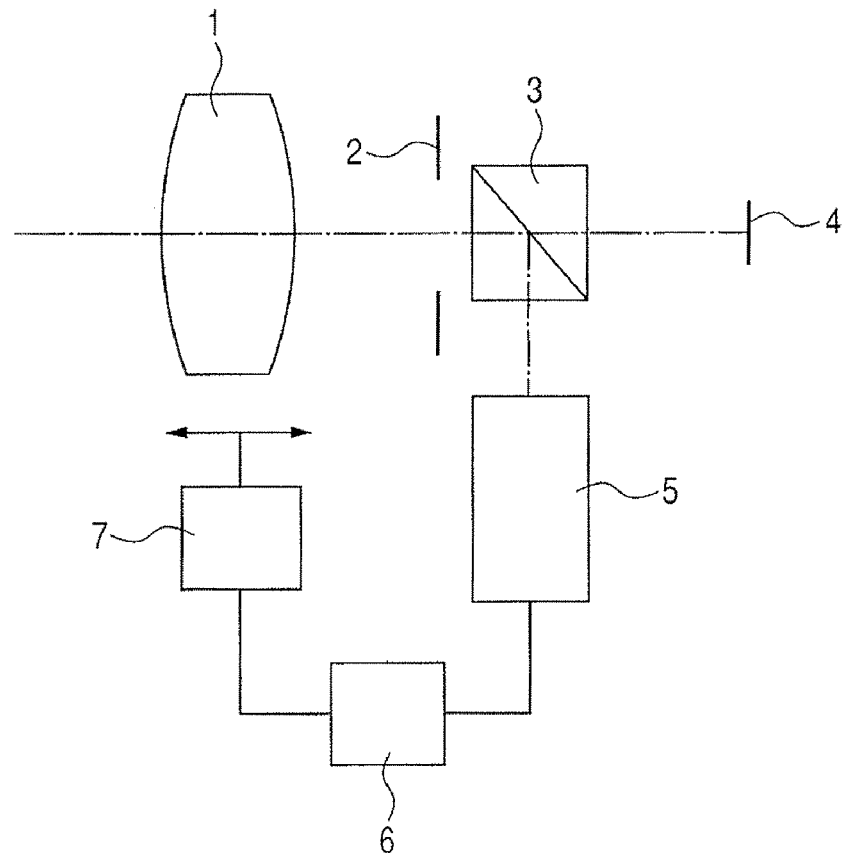
FIG. 1 shows a configuration of a first embodiment.

Referring to FIG. 1, a configuration of a first embodiment is shown.

Behind a focus lens unit 1, an aperture stop 2, a splitting optical system 3 having an ununiform reflectance and an image pickup element 4 are arranged. Focus detection means 5 is disposed in the splitting/reflecting direction of the splitting optical system 3 such as a half mirror. An output of the focus detection means 5 is connected to computing means 6, and an output of the computing means 6 is connected to driving means 7. The driving means 7 drives the focus lens unit 1.

This optical system has, for example, F number 1.8 and a diameter of the aperture stop 2 of 30 mm in a full-aperture state. Since spacing between the aperture stop 2 and the splitting optical system 3 is very small, a diameter of an area through which a light beam passes in the full-aperture state in the splitting optical system 3 is 30 mm similar to that of the aperture stop.

The focus detection means 5 use a so-called phase difference method, and for a light beam used for focus detection, only a light beam passing through the inside of a portion having F number 5.4 is used.

Figure 2:
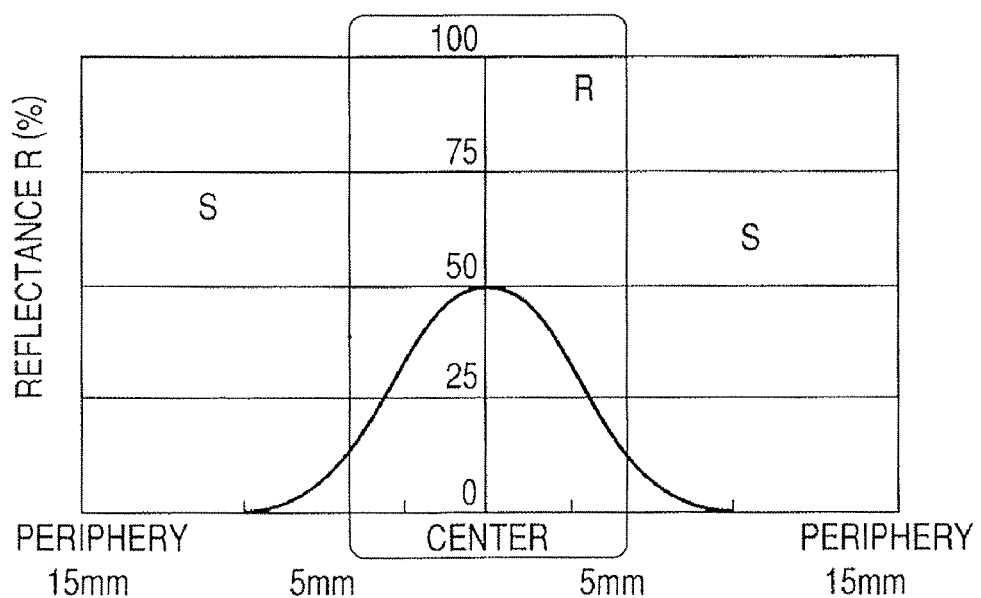
FIG. 2 is a graph illustrating reflection distribution of a splitting optical system.

FIG. 2 shows reflectance characteristics of the splitting optical system 3 in the central portion and circumferential portion. The longitudinal axis represents reflectance of the splitting optical system 3, and the lateral axis represent a distance from an optical axis of the splitting optical system 3.

The reflectance on the optical axis of the splitting optical system 3 is 50%, and the reflectance in a portion through which a light beam passes most far away from the optical axis (15 mm from the optical axis) is 0%, and the reflectance in a portion coming close to the central portion becomes larger.

In the case of the focus detection means 5 using the phase difference method, a central portion R corresponds to a minimal area containing the entirety of a light beam actually used for focus detection. A peripheral portion S corresponds to an area through which a light beam passes excluding the central portion R. Since the light beam used for focus detection is only a light beam passing through a portion near side to the optical axis from the portion having F number 5.4, the central portion R may be defined as an area with a distance of below 5 mm from the optical axis, and the peripheral portion S may be defined as an area located between 5 and 15 mm from the optical axis.

Figure 3:
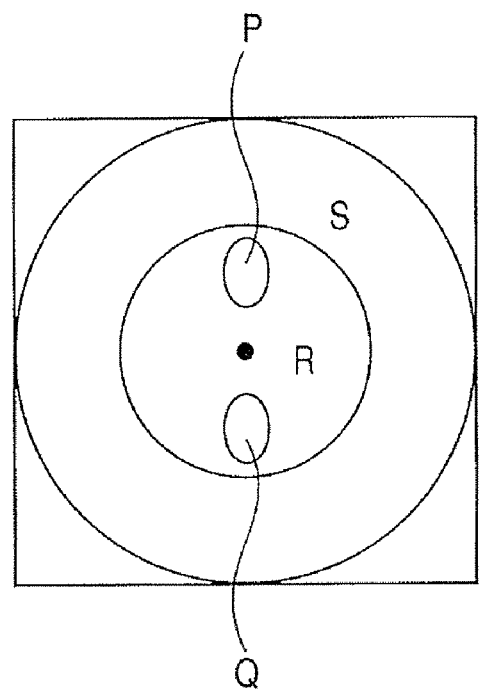
FIG. 3 illustrates an area through which a light beam passes in a splitting optical system.

FIG. 3 shows an area through which a light beam passes in the splitting optical system 3. In the phase difference method, areas P and Q show areas of a light beam used for focus detection by the focus detection means 5.

In this case, an average reflectance Rr in the central portion R is 35%, and an average reflectance Sr in the peripheral portion S is 5%. An area Rq of the central portion R is 78.5 mm², an area Sq of the peripheral portion S is 628.3 mm², and the total area Q of the central portion R and peripheral portion S, Q=Rq+Sq, equals 706.8 mm².

In fact, by configuring the average reflectance Rr being 35%, a sufficient amount of light for focus detection is secured for the focus detection means 5. A ratio W1 of an amount of light directed to the image pickup element 4 and a ratio W2 of an amount of light directed to the of the focus detection means 5 are expressed by the following expressions (1) and (2):

$$W1=1-Rr \cdot Rq/Q-Sr \cdot Sq/Q=0.894 \quad (1)$$

$$W2=Rr \cdot Rq/Q+Sr \cdot Sq/Q=0.106 \quad (2)$$

Therefore, 89% of the amount of light is directed to the image pickup element 4, and a decrease in the amount of light of the subject image light on the image pickup side may be reduced to 11%.

In this embodiment, while a necessary light beam for focus detection is efficiently split to the focus detection means 5, the reflecting characteristic of the splitting optical system 3 is specified so as to minimize the decrease in the amount of light for image pickup. Especially, when only a part of a light beam is used for focus detection, as in the case of the focus detection means 5 using the phase difference method, reflectance of the splitting optical system 3 is set higher in a portion through which a light beam passes, and set lower in the other portions. Accordingly, securement of a sufficient amount of light for focus detection for the focus detection means 5 and a reduction of a decrease in the amount of light for image pickup may be achieved by reflecting selectively a light beam only for focus detection to the focus detection means 5.

Figure 4:
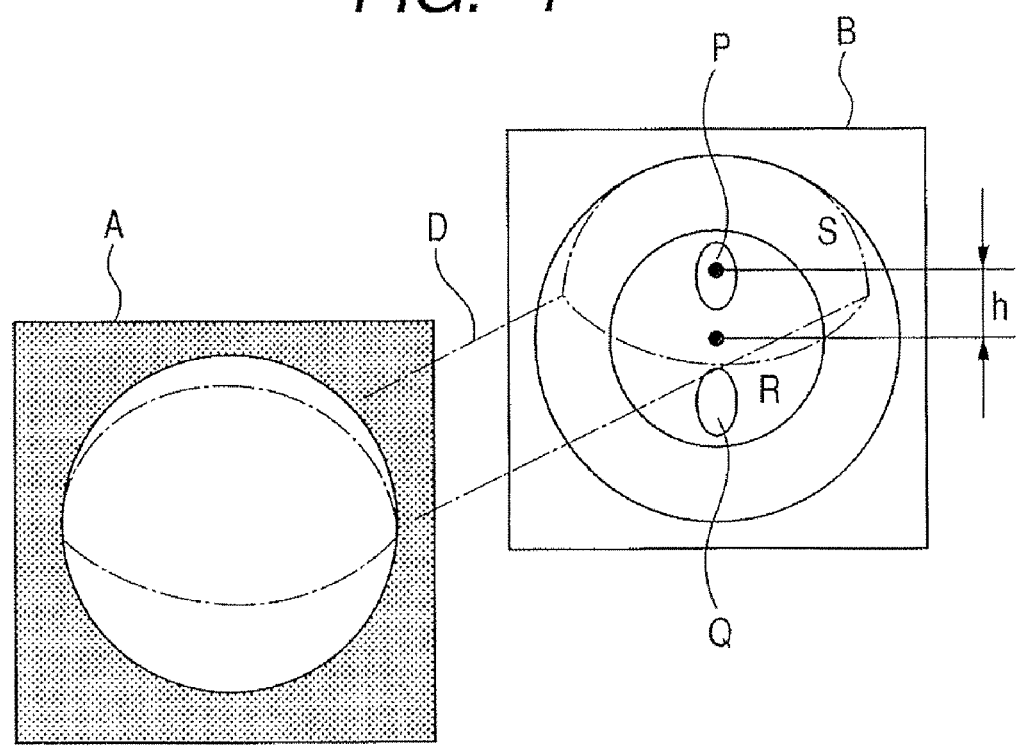
FIG. 4 is a cross sectional view illustrating an image plane center beam and image plane circumference beam with a splitting optical system being displaced by a certain distance from an aperture stop.

FIG. 4 is a cross sectional view illustrating an image plane circumference beam with the splitting optical system 3 being displaced by a certain distance from the aperture stop 2. The reference numeral A represents a cross section at the aperture stop 2, the reference numeral B represents a cross section at the splitting optical system 3, the reference numeral D represents an image plane circumference beam, and the reference numeral h represents a height of an off-axis principal ray.

Let "d" be an optical path length between the aperture stop 2 and the splitting optical system 3, let "α" be an off-axis principal ray angle at the aperture stop 2, and then, an off-axis principal ray incident height h is approximately proportional to d, and the following expression is satisfied.

$$h \approx d\alpha \quad (3)$$

The larger the off-axis principal ray height h is, the smaller an area where the image plane circumference beam D passes through the central portion R having a higher reflectance becomes, and accordingly, the focus detection means 5 may not be supplied with a sufficient amount of light for focus detection. Therefore, the length d between the splitting optical system 3 and the aperture stop 2 is set shorter, and the off-axis principal ray height h is set lower. With this configuration, an area where the image plane circumference beam D also passes through the areas P and Q used for focus detection can be made larger. Therefore, the sufficient amount of light for focus detection relative to the image plane peripheral portion may be brought into incidence on the focus detection means 5.

Second Embodiment

Figure 5:
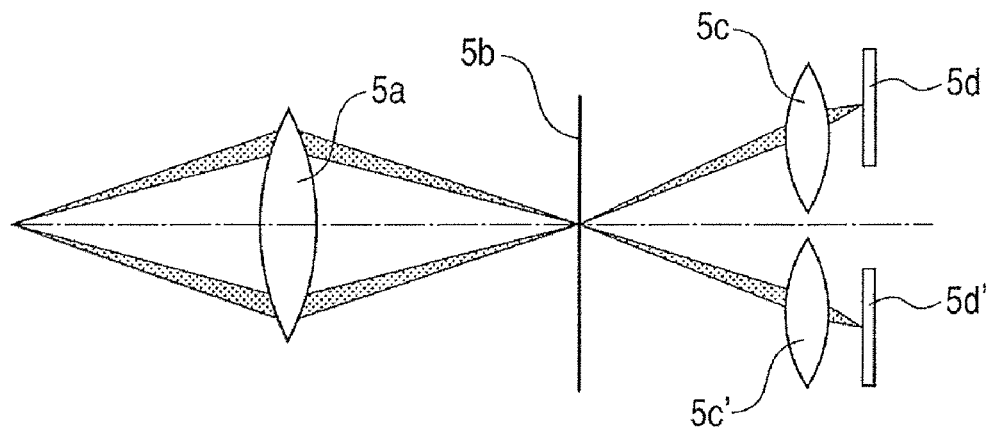
FIG. 5 illustrates an optical path in a focus state according to a phase difference method.
Figure 6:
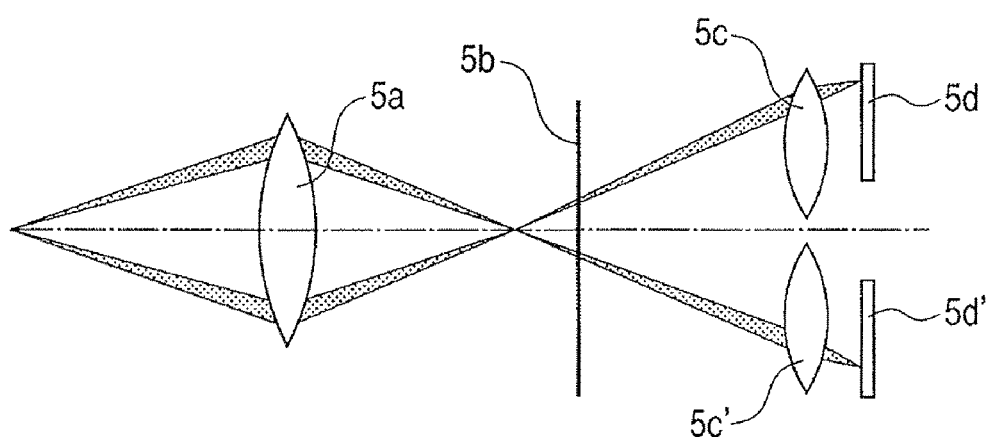
FIG. 6 illustrates the optical path in a front focus state according to the phase difference method.
Figure 7:
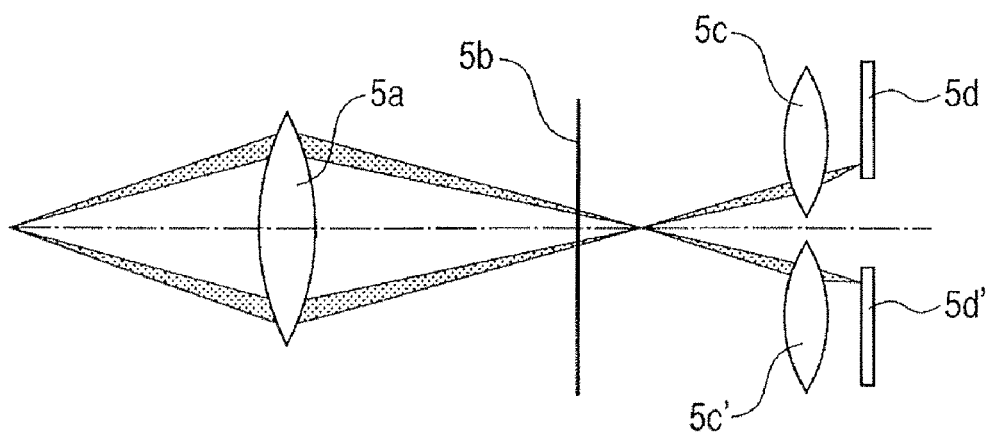
FIG. 7 illustrates the optical path in a rear focus state according to the phase difference method.

Referring to FIG. 5, an optical path in a focus state of the focus detection means 5 is illustrated, in FIG. 6, the optical path in a front focus state is illustrated, and in FIG. 7, the optical path in a rear focus state is illustrated.

A first lens unit 5a in the focus detection means 5 images a split light beam. The light beam is imaged on a primary image plane 5b by this first lens unit 5a.

Two second lens units 5c and 5c' for secondary imaging having positive refractive power are provided behind the primary image plane 5b. A light beam is imaged on two sensors 5d and 5d' for detection of phase difference by the second lens units 5c and 5c'.

In the so-called front focus state shown in FIG. 6, a focal position of the imaging lens 4a is located on the subject side of the primary image plane 5b. In the so-called rear focus state in FIG. 7, the focal position of the imaging lens 4a is located on the image side of the primary image plane 5b.

As shown in FIG. 5, when a light beam passed through the imaging lens 4a is imaged on the primary image plane 5b, a secondary image is formed on a predetermined position of each of the sensors 5d and 5d', respectively.

On the contrary, as shown in FIG. 6, when a light beam passed through the imaging lens 4a is imaged ahead of the primary image plane 5b, a phase difference relative to a reference image position is produced at the sensors 5d and 5d'. The focal position may be computed by detecting the direction and amount of change in the phase.

FIG. 7 shows a case in which a light beam is imaged at the back of the image plane 5b. Then, the phase difference of the image is opposite to that in FIG. 6.

Figure 8:
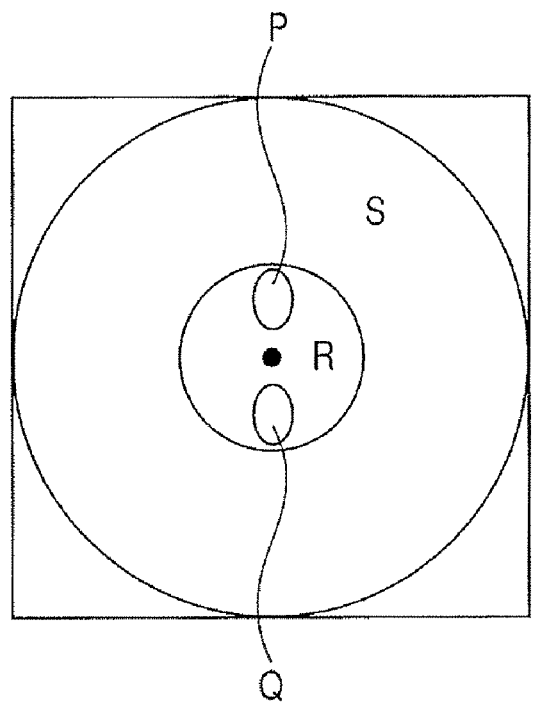
FIG. 8 illustrates an area through which a light beam passes in a splitting optical system.

FIG. 8 illustrates an area through which a light beam passes in the splitting optical system 3. Areas P and Q show an area of a light beam which is split in the manner of pupil division by the second lens units 5c and 5c' for the secondary imaging of the focus detection means 5, and used for focus detection.

A central portion R illustrates a circle of a minimal radius R (F number: 5.4, radius: 5 mm) which includes the area P and Q used for focus detection and is concentric with the splitting optical system 3. A peripheral portion S illustrates an area through which a light beam passes excluding the central portion R (F number: 1.8, radius: 15 mm).

In the phase difference detection method, an incident light beam on the focus detection means 5 is split in the manner of pupil division by the second lens units 5c and 5c' for secondary imaging, and only an incident light beam on the areas P and Q is used for focus detection.

Figure 9:
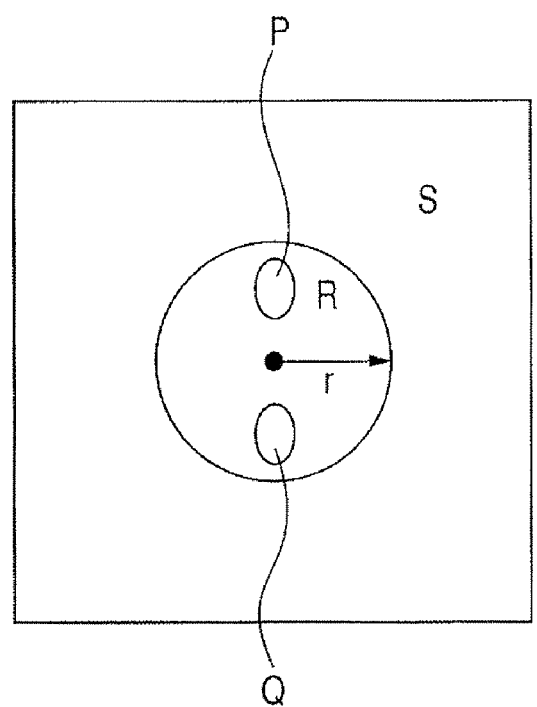
FIG. 9 illustrates an area through which a light beam passes in a splitting optical system.

Therefore, the splitting optical system 3 as in the first embodiment is configured to have a higher reflectance in the central portion R which includes the areas P and Q in FIG. 9, of the minimal diameter and a lower reflectance in the peripheral portion S excluding the central portion R.

As described above, by configuring the reflectance of the splitting optical system 3 so as to selectively reflect a light beam only used for focus detection in a focus detection system, a sufficient amount of light for the focus detection system can be secured and a decrease in an amount of light for image pickup can be reduced.

It may be desirable that reflectance distribution satisfies the following expressions:

$$K \leq \phi(L), (0<L \leq r) \quad (4)$$

$$\phi(L) \approx 0, (r<L) \quad (5)$$

where in FIG. 9, φ(L) represents reflectance on the splitting optical system 3 at a point at a distance L from the center of the splitting optical system 3, and K is reflectance necessary for focus detection when reflectance of the splitting optical system 3 is constant, and r is a radius of the central portion R.

Since an average reflectance in the areas P and Q can be set larger than the reflectance K by satisfying of the expression (4), a sufficient amount of light for focus detection may be directed to the focus detection means 5. Also, since much of light beam not used for focus detection in a portion excluding the areas P and Q can be directed to an image pickup system by satisfying of the expression (5), a decrease in an amount of light of the subject image for the image pickup system may be reduced.

Third Embodiment

Figure 10:
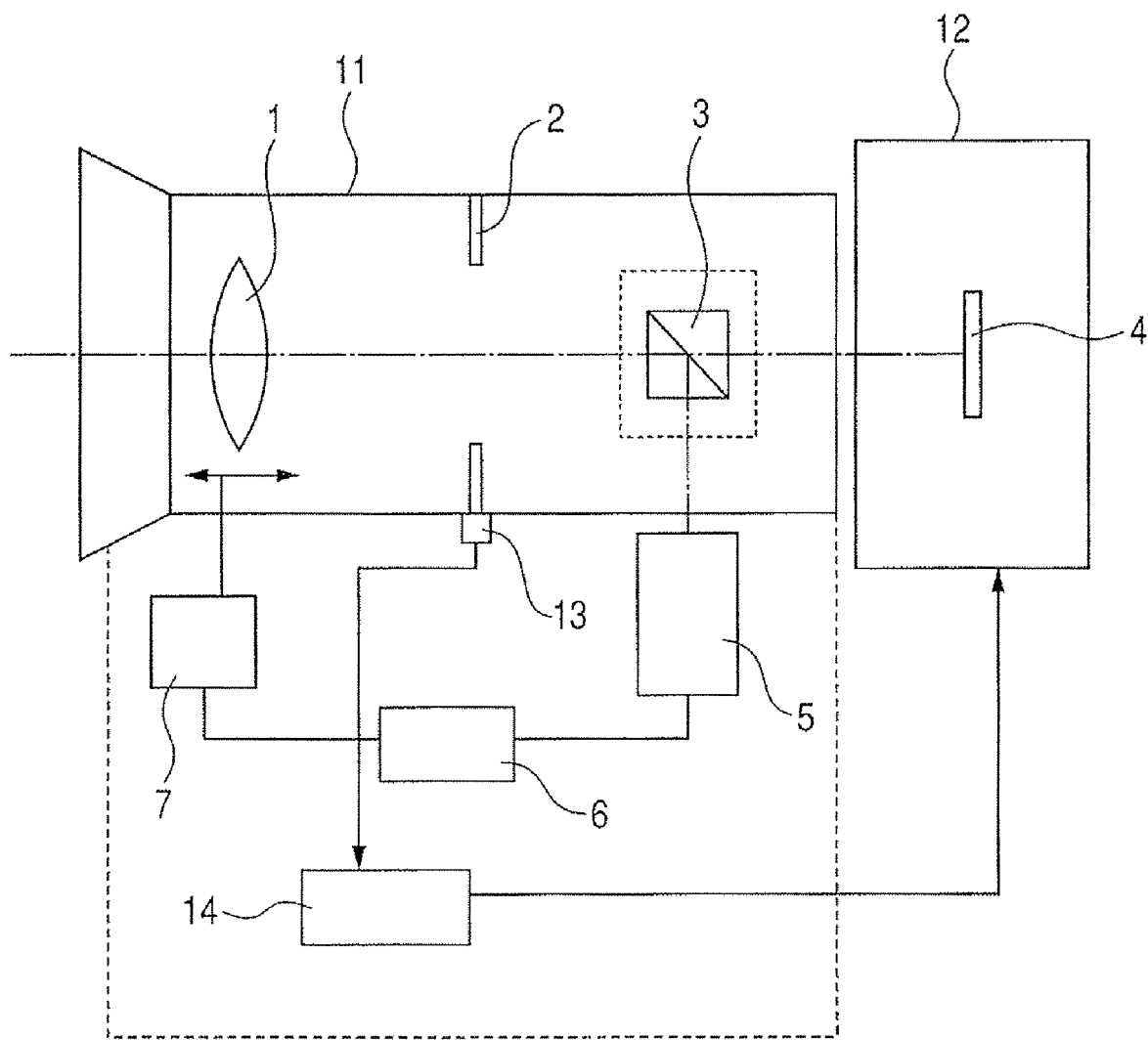
FIG. 10 shows a configuration of a third embodiment.

FIG. 10 shows a configuration of an image pickup device of a third embodiment. The like elements as those in FIG. 1 are denoted with the like reference signs. An image pickup device includes an autofocus optical system 11 and an image pickup portion 12. The autofocus optical system 11 includes the focus lens unit 1, the aperture stop 2 and the splitting optical system 3. Focus detection means 5 is disposed in splitting direction of the splitting optical system 3. An output of the focus detection means 5 is connected to computing means 6. An output of the computing means 6 is connected to driving means 7. The driving means 7 drives the focus displacement means 1. Further, aperture stop detection means 13 for detecting a position of the aperture stop 2 is provided. An output of the aperture stop detection means 13 is connected through correction computing means 14 to the image pickup portion 12.

The aperture stop detection means 13 detects a stop value of the aperture stop 2, and based on the stop value, the correction value computing means 14 computes a correction value for image plane correction. The computed value is transmitted to the image pickup portion 12, and the image pickup portion 12 corrects for image plane luminance.

Figure 11:
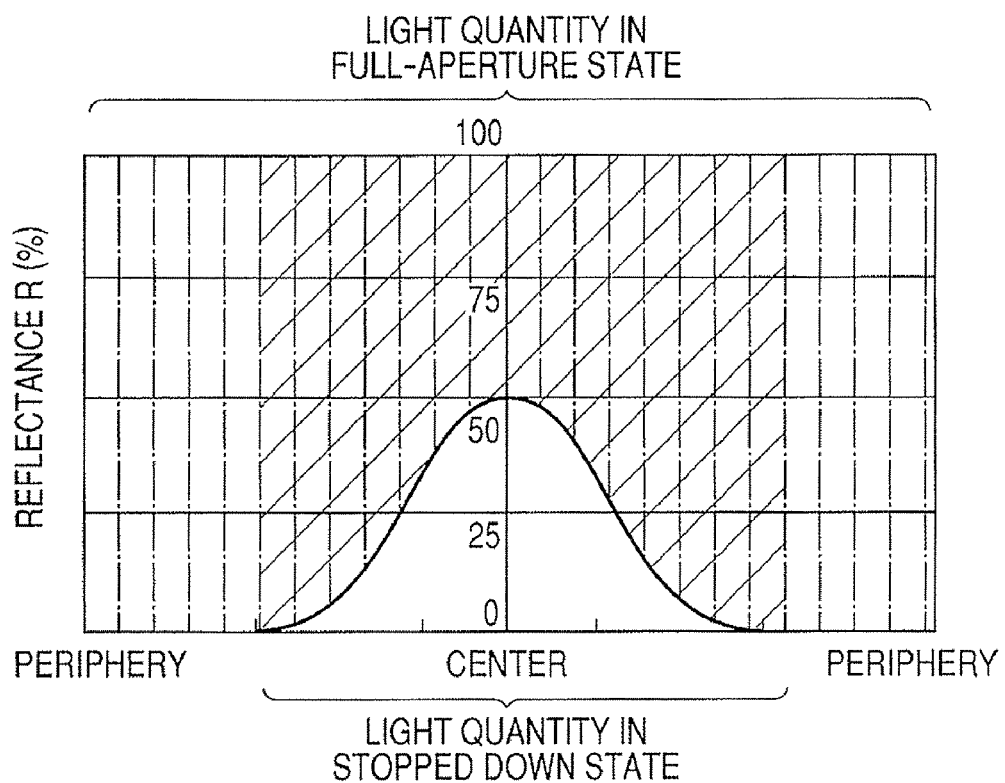
FIG. 11 illustrates amounts of light incident on an image pickup system for a full-aperture state and a stopped down state in a splitting optical system in which the reflectance differs between in the central portion and the circumferential portion.

FIG. 11 shows an amount of incident light on the image pickup system 12 in a full-aperture state of the aperture stop 2 and an amount of incident light on the image pickup portion 12 in a stopped down state of the aperture stop 2, when, in the splitting optical system 3, reflectance is varied depending on a position on a splitting surface thereof. The longitudinal axis represents reflectance of the splitting optical system 3, and the lateral axis represents a position on the splitting optical system 3 from the periphery to the center, then to the periphery. Further, in a portion shown by vertical lines, the amount of incident light on the image pickup portion 12 in the full-aperture state of the aperture stop 2 is shown, and in a portion shown by diagonal lines, the amount of incident light on the image pickup portion 12 in the stopped down state of the aperture stop 2 is represented.

Figure 12:
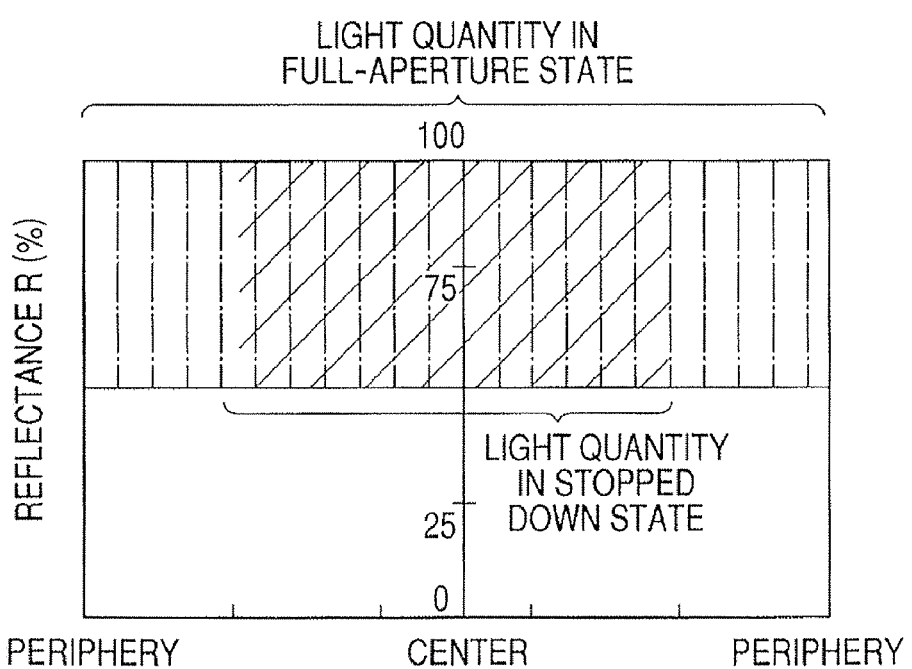
FIG. 12 illustrates amounts of light incident on an image pickup system for a full-aperture state and a stopped down state in a splitting optical system having constant reflectance.

FIG. 12 shows an amount of incident light on the image pickup portion 12 in the full-aperture state of the aperture stop 2 and an amount of incident light on the image pickup portion 12 in the stopped down state of the aperture stop 2, when, as in a conventional embodiment, reflectance of the splitting optical system 3 is constant.

Comparing between FIG. 11 and FIG. 12, a decrease from the amount of light in the full-aperture state of the aperture stop 2 to that in the stopped down state, in the case of the splitting optical system 3 having the ununiform reflectance, is larger than a decrease in the case of the splitting optical system 3 having the constant reflectance. Therefore, in the case of the splitting optical system 3 having the ununiform reflectance, it is necessary to prevent a rapid decrease in the amount of light on an image plane at the time of the aperture stop 2 being stopped down by increasing a gain electrically when the detected aperture stop value goes large.

Fourth Embodiment

Figure 13:
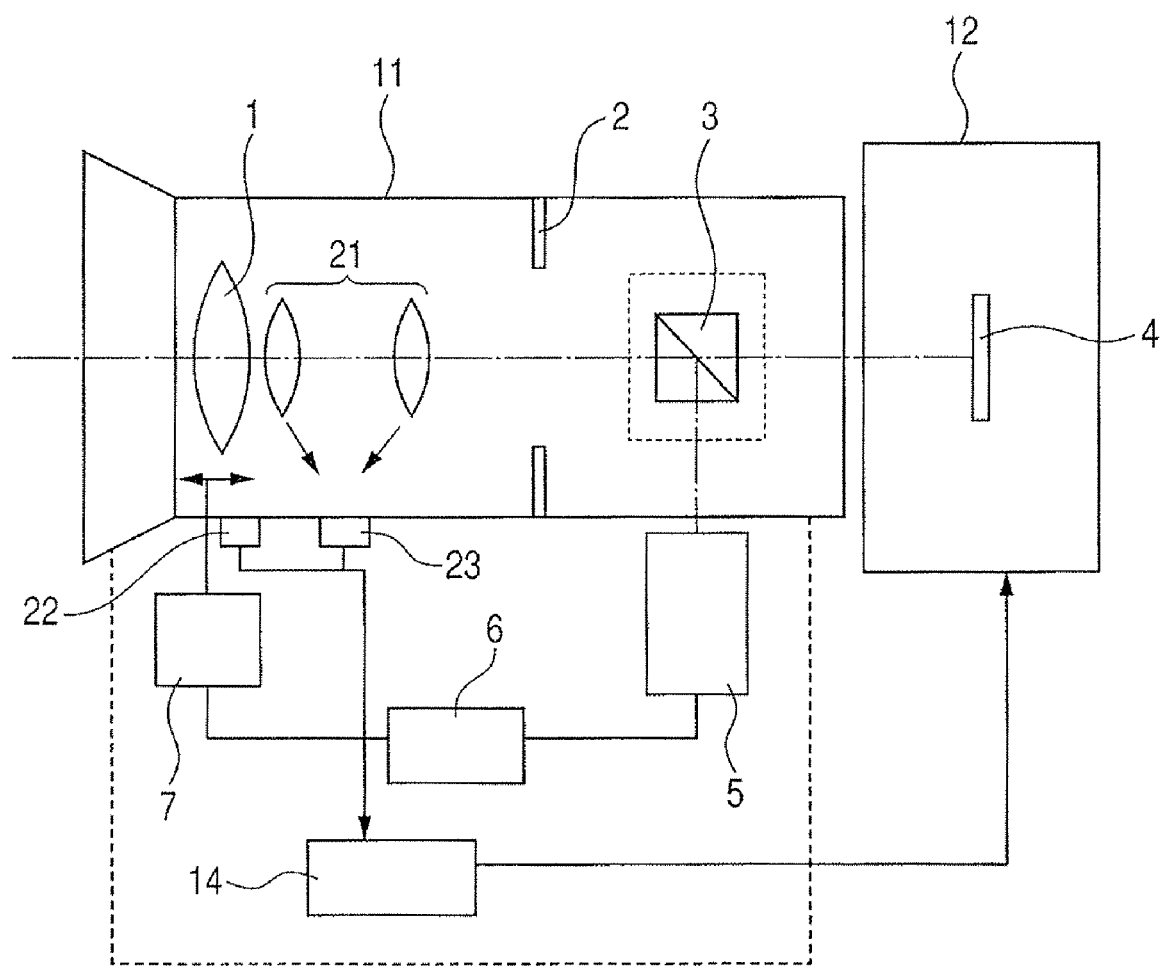
FIG. 13 shows a configuration of a fourth embodiment.

FIG. 13 shows a configuration of an image pickup device of a fourth embodiment. In addition to the third embodiment shown in FIG. 10, a magnification lens unit 21 is disposed behind the focus lens unit 1 within the focus optical system 11. Focus detection means 22 for detecting a position of the focus lens unit 1 and zoom detection means 23 for detecting a position of the magnification lens unit 21 are provided, and their output are connected to the correction computing means 14.

In this fourth embodiment, the positions of the focus lens unit 1 and the magnification lens unit 21 are obtained by the focus detection means 22 and the zoom detection means 23, respectively, a correction value for image plane correction is computed by the correction computing means 14, and then the resultant correction value is transmitted to the image pickup portion 12 correct an image plane.

When an incident light beam on the splitting optical system 3 varies due to change in pupil division caused by zoom and/or focus displacement, in the case of the splitting optical system having the ununiform reflectance, balance between an amount of light in the central portion and that in the peripheral portion varies with the displacement of the zoom and/or focus.

When zoom and/or focus value detected is such in that the balance between the amount of light in the central portion and that in the peripheral portion may be largely unbalanced, the balance between the amount of light in the central portion and that in the peripheral portion can be maintained by an electrical correction in a manner of axial symmetry with the center of an image plane being a reference.

Figure 14:
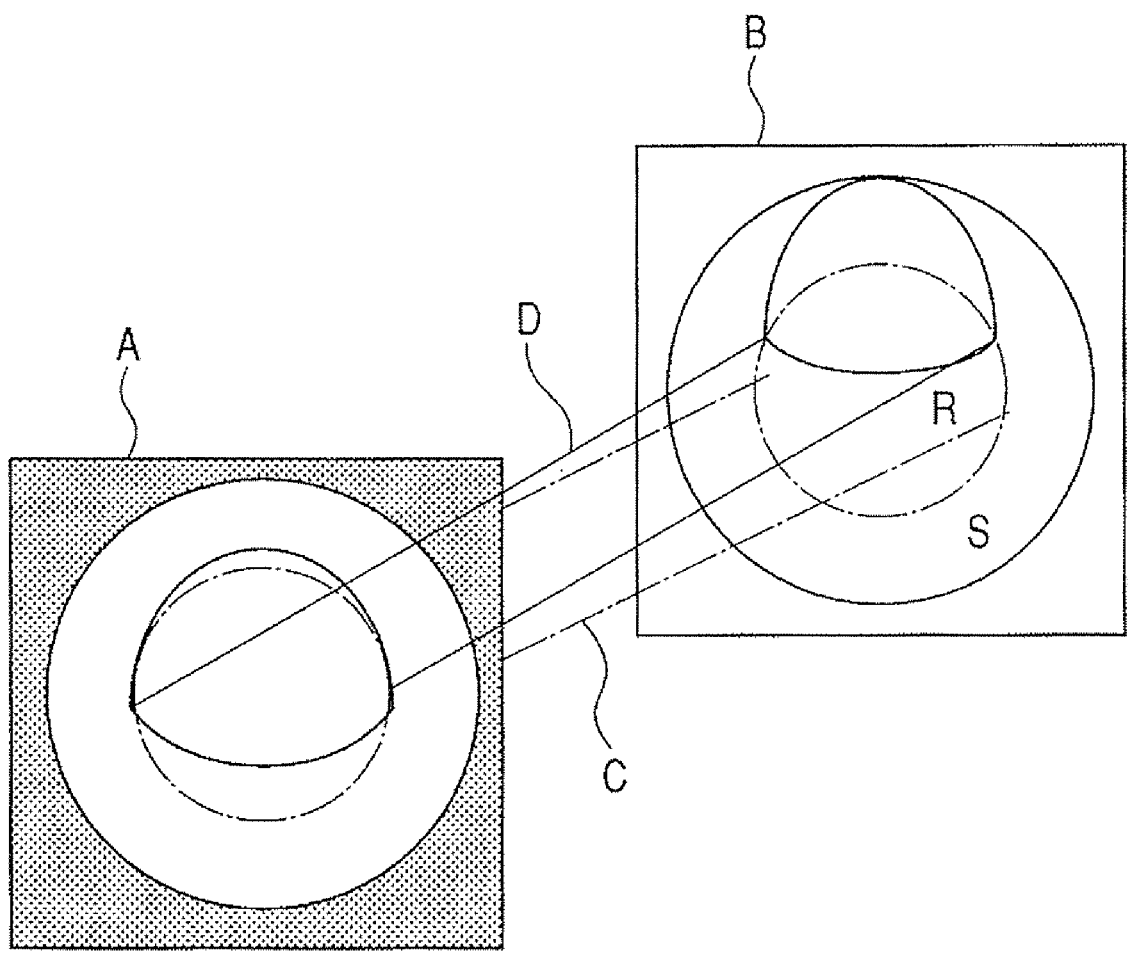
FIG. 14 is a cross sectional view illustrating an image plane center beam and image plane circumference beam with the center light beam being split in the manner of pupil division.

FIG. 14 illustrates optical paths of an image plane center beam and an image plane circumference beam in the case of the splitting optical system 3 being displaced by a certain distance from the aperture stop 2. The aperture stop 2 is shown by A, the splitting optical system 3 by B, the image plane center beam by C, and the image plane circumference beam having an angle of field by D.

When the image plane center beam is split in the way of pupil division due to magnification by the magnification lens unit 21, in the case where the splitting optical system 3 having the ununiform reflectance is used, the image plane center beam C, in addition to pupil division, will pass through the central portion R having a higher reflectance, so that an amount of light decreases largely.

On the contrary, because the image plane circumference beam D passes through the peripheral portion S having a lower reflectance offset from the central portion R of the splitting optical system 3, an amount of light of the image plane circumference beam becomes larger than the amount of light of the image plane center beam.

Therefore, by performing a correction so as to electrically raise a gain to the maximum extent possible in the center of an image plane and to gradually lower the gain toward the peripheral portion in the image plane, the balance of the whole image plane can be kept better.

Fifth Embodiment

Figure 15:
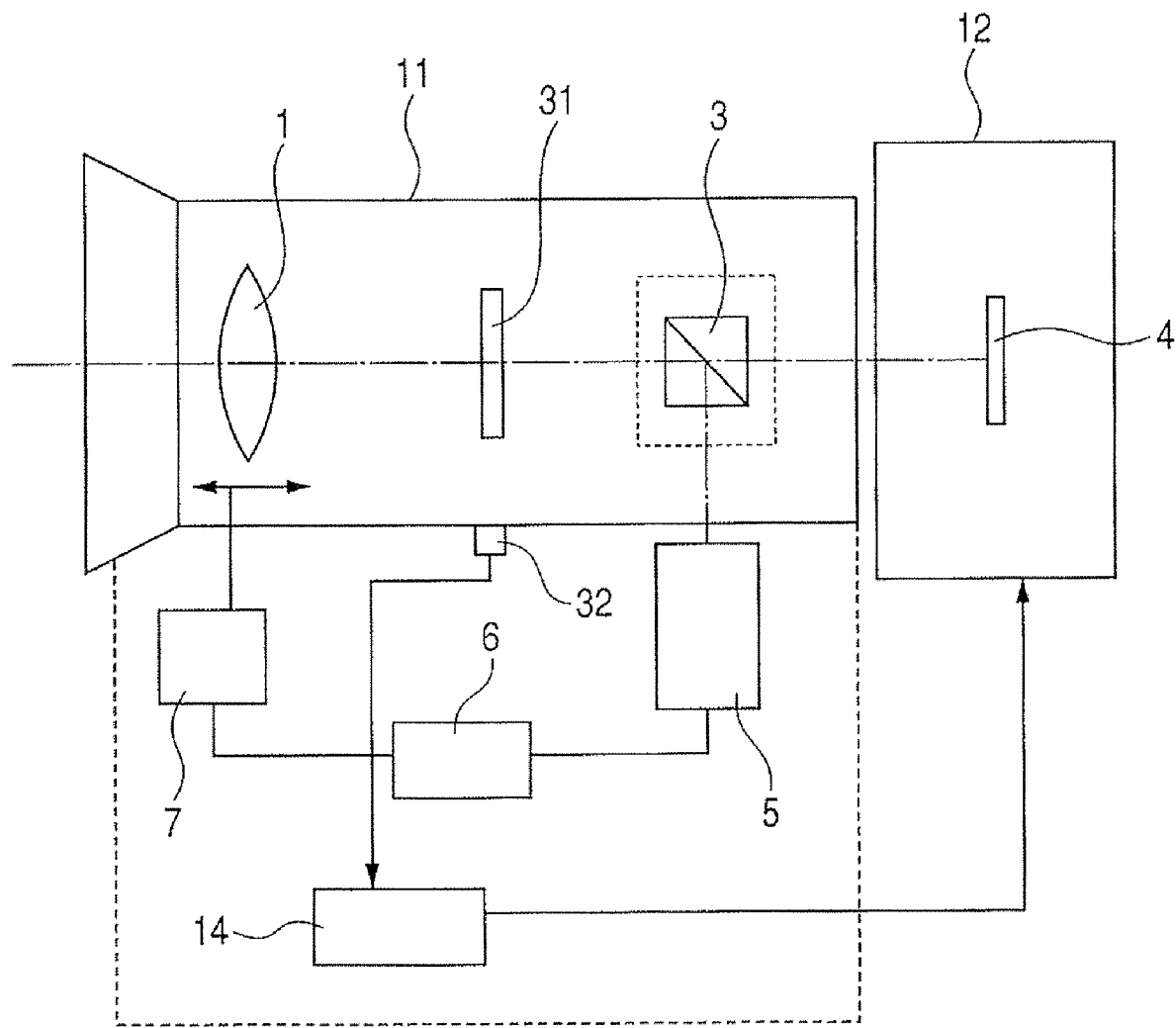
FIG. 15 shows a configuration of a fifth embodiment.

Referring to FIG. 15, a configuration of an image pickup device of a fifth embodiment is shown. The similar elements as the elements of the third embodiment in FIG. 10 are denoted with the same reference signs. An image blur correction optical system 31 is provided between the focus lens unit 1 and the splitting optical system 3 in the autofocus optical system 11. Displacement detection means 32 for detecting an amount of displacement of the image blur correction optical system 31 is provided, and an output of the displacement detection means 32 is connected to the correction computing means 14.

A position of the image blur correction optical system 31 is obtained by the displacement detection means 32, and based on this position, a correction value for image plane correction is computed by the correction computing means 14, thereby correcting an image plane at the image pickup portion 12.

In this fifth embodiment, displacement of the image blur correction optical system 31 may cause light incident on the splitting optical system 3 to change. On the contrary, because the splitting optical system 3 having a concentric reflectance distribution is fixed, the displacement of light incident on the splitting optical system 3 may cause an amount of light incident on the image pickup system in the left, right, top and bottom of an image plane to become asymmetrical.

Therefore, depending on an amount of the displacement of the image blur correction optical system 31, increasing electrically a gain to an arbitrary value at an arbitrary position in the image pickup portion may maintain balance of the amount of light in the entire image plane.

Sixth Embodiment

Figure 16:
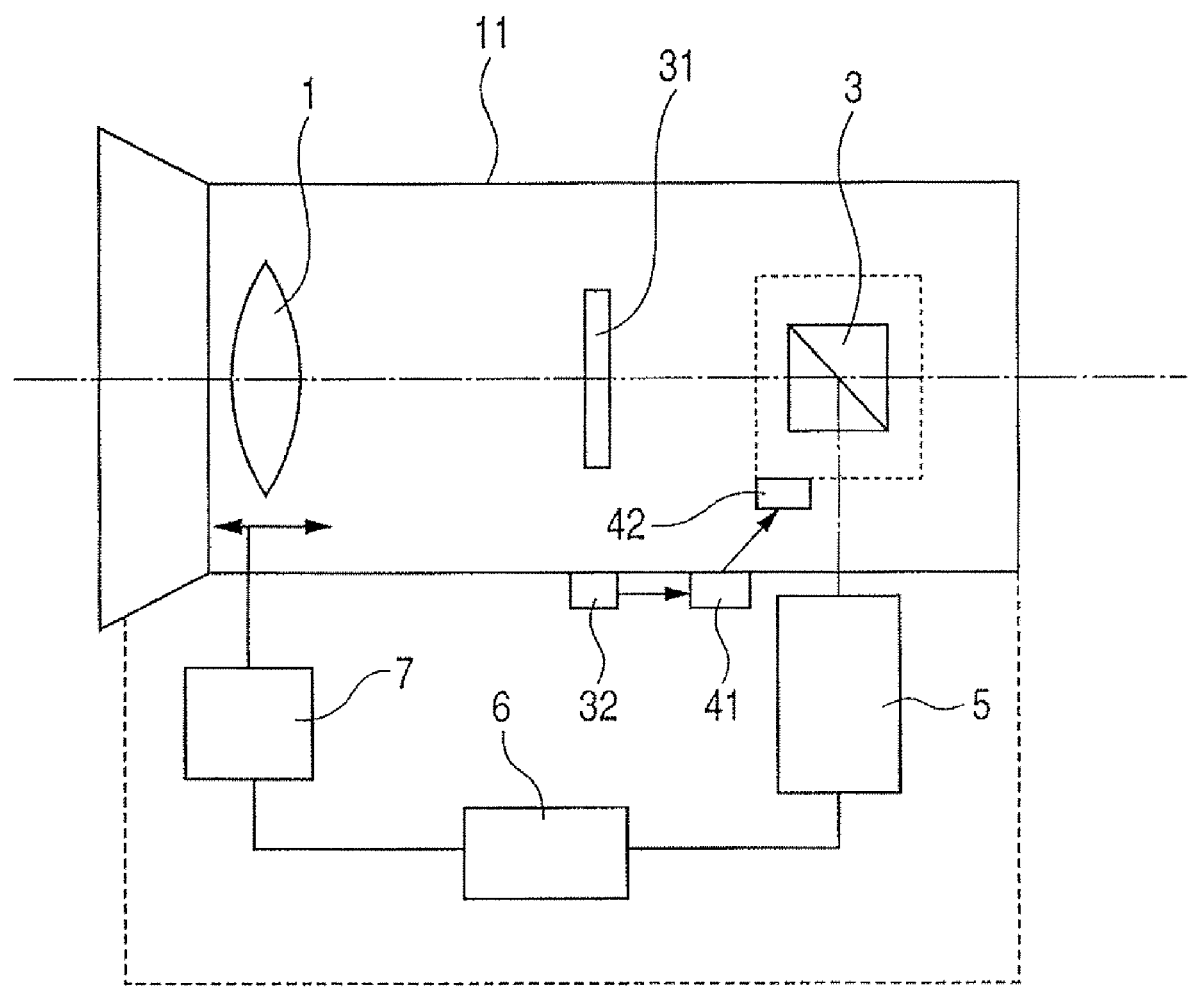
FIG. 16 shows a configuration of a sixth embodiment.

FIG. 16 shows a configuration of a sixth embodiment. In addition to the fifth embodiment shown in FIG. 15, the output of the displacement detection means 32 of the image blur correction optical system 31 is connected to drive computing means 41, and an output of the drive computing means 41 is connected to a drive motor 42 for driving the splitting optical system 3.

A position of the image blur correction optical system 31 is obtained by the displacement detection means 32, and a drive value for driving the splitting optical system 3 is computed by the drive computing means 41. Based on the drive value computed, the splitting optical system 3 is driven by the drive motor 42.

Displacement of the image blur correction optical system 31 may cause light beam incident on the splitting optical system 3 to change.

Therefore, by displacing the splitting optical system 3 so as to keep the symmetry of an amount of light on an image plane depending on the displacement of the image blur correction optical system 31, change in the amount of light due to image stabilizing may be corrected. In such a manner, balance of the amount of light on the entire image plane may be achieved.

As to the displacement of the splitting optical system 3, even if the splitting optical system 3 is displaced, the optical path length to the focus detection means 5 needs to be kept constant. Therefore, it is necessary for only the splitting optical system 3 to be driven along a reflecting surface, or both the splitting optical system 3 and the focus detection means 5 to be driven in up and down direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-266057, filed on Sep. 13, 2005, which is hereby incorporated by reference herein in its entirety.

What is claimed is:

1. An image pickup device comprising:
a focus lens unit that moves during focusing;
a magnification lens unit that moves during zooming;
a splitting optical system disposed in an optical path on an image side of the focus lens unit, wherein the splitting optical system splits a light beam from a subject into a reflected light beam and a passed light beam, and wherein the passed light beam is used for imaging the subject image;
an image pickup element to which the passed light beam through the focus lens unit and the magnification lens unit is directed;
a focus detection unit that detects a focus state of the subject image by using the reflected light beam split in the splitting optical system; and
a drive unit that drives the focus lens unit to a focal position for imaging the subject image by using the passed light beam based on the detection result of the focus detection unit;
wherein a reflectance of the splitting optical system against the light beam from the subject has a distribution in which the reflectance is of the maximal value on an optical axis and becomes gradually lower as the light beam is away from the optical axis, and the distribution has rotational symmetry about the optical axis; and
wherein the focus detection unit detects the focus state of the subject image by using a portion of the reflected light beam which is reflected by the higher reflectance portion of the splitting optical portion including the optical axis.

2. The image pickup device according to claim 1, wherein an aperture stop is disposed adjacent to the subject side of said splitting optical system.

3. The image pickup device according to claim 1, wherein said focus detection unit comprises a optical system for focus detection including, in order from the subject side, a first lens unit having positive refractive power for primary imaging and a second lens unit having at least one pair of lenses disposed symmetrically about the optical axis and each lens of the pair of lenses having positive refractive power for secondary imaging.

4. The image pickup device according to claim 1, further comprising:
an image blur correction optical system for correcting the subject image blur by vertically moving relative to the optical axis;
a position detection unit that detects a position of the image blur correction optical system;
a drive unit that drives the splitting optical system vertically relative to the optical axis; and
a control unit that controls the driving of the splitting optical system;
wherein the control unit displaces the splitting optical system based on a value detected by the position detection unit.

5. The image pickup device according to claim 1, further comprising:
an aperture stop disposed adjacent to the subject side of said splitting optical system; and
a magnification lens unit which moves when varying magnification, the magnification lens unit being disposed between the aperture stop and the focus lens unit.

6. The image pickup device according to claim 1, wherein the focus detection unit detects the focus state by using a phase difference method.

7. The image pickup device according to claim 2, further comprising a magnification lens unit which moves when varying magnification,
wherein the aperture stop is disposed in the subject side of the splitting optical system, and
wherein the magnification lens unit is disposed in the subject side of the aperture stop and in the image side of the focus lens unit.

8. An image pickup device comprising:
a focus lens unit that moves during focusing;
a magnification lens unit that moves during zooming;
a splitting optical system disposed in an optical path on an image side of the focus lens unit, wherein the splitting optical system splits a light beam from a subject into a reflected light beam and a passed light beam, and wherein the passed light beam is used for imaging the subject image;

focus detection means for detecting a focus state of the subject image by using the reflected light beam split by the splitting optical system, wherein a reflectance of the splitting optical system against the light beam from the subject has a distribution in which the reflectance is of the maximal value on an optical axis and becomes gradually lower as the light beam is away from the optical axis, and the distribution has rotational symmetry about the optical axis, wherein the focus detection unit detects the focus state of the subject image by using a portion of the reflected light beam which is reflected by the higher reflectance portion of the splitting optical portion including the optical axis;

drive means for driving the focus lens unit to a focal position for imaging the subject image by using the passed light beam based on a detection result of the focus detection means;

image pickup means for taking the subject image imaged by the focus lens unit wherein the passed light beam through the focus lens unit and the magnification lens unit is directed to the image pickup means;

image pickup means control means for controlling the image pickup means;

aperture stop means for limiting an amount of light to the image pickup means; and aperture stop value detection means for detecting an aperture stop value of the aperture stop means;

wherein the image pickup means is able to change a gain; and wherein the image pickup means control means controls a gain of the image pickup means based on a value detected by the aperture stop value detection means.

9. An image pickup device comprising:

a focus lens unit that moves during focusing;

focus lens position detection means for detecting a position of the focus lens unit;

a splitting optical system disposed in an optical path on an image side of the focus lens unit, wherein the splitting optical system splits a light beam from a subject into a reflected light beam and a passed light beam, wherein the passed light beam is used for imaging the subject image, and wherein a reflectance of the splitting optical system against the light beam from the subject has a distribution in which the reflectance is of the maximal value on an optical axis and becomes gradually lower as the light beam is away from the optical axis, and the distribution has rotational symmetry about the optical axis;

focus detection means for detecting a focus state of the subject image by using a portion of the reflected light beam which is reflected by the higher reflectance portion of the splitting optical system including the optical axis;

drive means for driving the focus lens unit to a focal position for imaging the subject image by using the passed light beam based on a detection result of the focus detection means;

image pickup means for taking the subject image imaged by the focus lens unit;

image pickup means control means for controlling the image pickup means;

a magnification lens unit for magnifying the subject image; and magnification lens position detection means for detecting a position of the magnification lens, wherein the image pickup means control means electrically corrects change in an amount of peripheral light based on values detected by the magnification lens position detection means and the focus lens position detection means.

10. The image pickup device according to claim 9, wherein the image pickup means control means electrically raises a gain to the maximum extent possible in the center of an image plane of the image pickup means and gradually lower the gain toward the peripheral portion in the image plane.

11. An image pickup device comprising:

a focus lens unit that moves during focusing;

a magnification lens unit that moves during zooming;

focus lens position detection means for detecting a position of the focus lens unit;

a splitting optical system disposed in an optical path on an image side of the focus lens unit, wherein the splitting optical system splits a light beam from a subject into a reflected light beam and a passed light beam, wherein the passed light beam is used for imaging the subject image, and wherein a reflectance of the splitting optical system against the light beam from the subject has a distribution in which the reflectance is of the maximal value on an optical axis and becomes gradually lower as the light beam is away from the optical axis, and the distribution has rotational symmetry about the optical axis;

focus detection means for detecting a focus state of the subject image by using a portion of the reflected light beam which is reflected by the higher reflectance portion of the splitting optical system including the optical axis;

drive means for driving the focus lens unit to a focal position for imaging the subject image by using the passed light beam based on a detection result of the focus detection means;

image pickup means for taking the subject image imaged by the focus lens unit, wherein the passed light beam through the focus lens unit and the magnification lens unit is directed to the image pickup means;

image pickup means control means for controlling the image pickup means;

an image blur correction optical system for correcting the subject image blur by moving vertically relative to the optical axis; and displacement detection means for detecting a displacement of the image blur correction optical system, wherein the image pickup means control means electrically corrects change in an amount of asymmetrical peripheral light based on a value detected by the displacement detection means.

* * * * *